United States Patent Office 3,511,668
Patented May 12, 1970

3,511,668
ARTIFICIALLY SWEETENED FREEZE
DRIED FOOD
Willard L. Vollink, Rudolph K. Scharschmidt, and Ralph Edward Kenyon, Battle Creek, Mich., assignors to General Foods Corporation, White Plains, N.Y., a corporation of Delaware
No Drawing. Continuation-in-part of application Ser. No. 370,350, May 26, 1964. This application Nov. 17, 1967, Ser. No. 683,777
Int. Cl. A23b 7/00
U.S. Cl. 99—83                                          10 Claims

ABSTRACT OF THE DISCLOSURE

Fruit is impregnated with an artificial sweetener prior to freeze-drying. The fruit can be combined with a dried breakfast cereal the moisture content of both being below 3%.

---

This application is a continuation-in-part of application Ser. No. 370,350, filed May 26, 1964, and now abandoned.

BACKGROUND OF THE INVENTION

This invention relates to a novel method for improving the flavor of foodstuffs and more particularly to a method of improving the flavor of freeze dried fruits. The artificially sweetened freeze dried fruits are particularly useful in combination with a dry breakfast cereal.

With the advent of freeze drying it has been possible to prepare freeze dried fruits by various methods which result in dried fruits which can be rehydrated in milk in from 30 to 60 seconds. These fruits are particularly advantageous for use with a dried breakfast cereal as the rate of rehydration in milk is sufficiently rapid such that the fruit is rehydrated before the cereal becomes undesirably soft and soggy. The result of blending a dry cereal and rapidly rehydratable fruit is a breakfast food which after addition of milk, consists of cereal with the desirable characteristics of crispness and rehydrated fruit which has the desirable texture of fresh fruit.

It has been found that consumer acceptance of the rehydrated fruits is greatly enhanced if the fruit is sweetened, as is consumer acceptance of commercially available canned or frozen fruits. Therefore, it is usual for canned or frozen strawberries, for example, to contain from about 20 to 30% added sugar by weight. However, attempts to sweeten freeze dried fruits prior to or after the freeze drying process by known methods such as dipping the foodstuff in a sugar solution, spraying a sugar solution on the foodstuff or dusting the sugar on the foodstuff have been notably unsuccessful, the sweetened product having an undesirable appearance. Also, in many instances the known methods of adding sugar result in serious processing difficulties.

When fresh fruit, for example strawberries, are dipped into a concentrated sugar solution (having a sugar concentration of about 40%) they tend to coalesce into large lumps during the freezing and freeze drying operations due to the inherent stickiness of the sugar solutions. In addition, the procedure of dipping results in a coating of sugar on the surface of the fruit which gives the fruit a glazed, foamy, unnatural appearance. Dipping in dilute sugar solutions (having a sugar concentration of about 20%) is unsatisfactory in that it is very difficult to impart sufficient sweetness to the product. Also the large amount of sugar solution which must be added to the fruit to impart the desired sweetness results in an undesirable increase in moisture content of the fruit which prolongs the freeze drying operation.

The technique of spraying either dilute or concentrated sugar solutions on the fresh strawberries or fruits is beset with the same problems encountered in dipping.

Attempts to introduce the sugar to the fruit after freezing is unsatisfactory. Spraying a sugar solution onto the fruit after freezing in sufficient quantity to impart the desired sweetness causes a thawing of the fruit due to a lowering of the freezing point. The partially thawed strawberries tend to lump and coalesce as they are being refrozen and additional processing steps and product appearance are then subject to the same disadvantages associated with dipping or spraying before freezing.

Dipping or spraying the freeze dried fruits with a sugar solution is unsatisfactory in that the product then tends to absorb a significant amount of moisture and an additional drying step is necessary. Also, the surface becomes coated with a film that destroys the natural appearance of the product.

Sugar applied by the foregoing methods as well as by applying powdered sugar on the fresh or dried strawberries for example, by dusting, fails to adhere well to the strawberries and is too easily lost when handling the dry product. The sugar which does remain on the strawberries is in the form which imparts to the strawberries an unnatural appearance. In addition the sugar which does remain on the strawberries tends to dissolve into the rehydrating liquid e.g. milk when the freeze dried fruit is rehydrated for use. Thus, it has not been possible by any known method to apply sufficient amounts of sugar to the fruits to produce a product having the desired sweetener prior to freeze drying and that a sweetened, the product and upon use imparting an undesirable sweetness to the rehydrating liquid.

SUMMARY

Quite unexpectedly, it has now been found that the surface of the fruits can be penetrated with an artificial sweetener prior to freeze drying and that a sweetened, freeze dried fruit is obtained with none of the disadvantages of prior art processes. The sweetener is caused to an least partially penetrate the surface during processing and process conditions are controlled to yield a rapidly rehydratable fruit. It is then found that the rehydration medium tends to further impregnate the fruit with the artificial sweetener. Also, the fruit tends to retain the artificial sweetener, and thus the desirable sweetness associated with natural fruit, for the period of time normally associated with the consumption of the product. For example, the fresh fruit can be dipped into a solution containing the artificial sweetener, drained and then slowly frozen under careful conditions such that the ice crystals tend to rupture the cell walls. The thus frozen fruit can then be freeze dried and the freeze dried fruit mixed with cereal flakes. The resultant product when used by the consumer with milk shows the following characteristics: the fruit is rehydrated in from 30 to 60 seconds, and has a natural appearance and desirable sweetness; the cereal is crisp and retains its desirable crispness during the rehydration period; the product is normally consumed within five minutes and it is found that within this period of time the milk does not pick up any noticeable sweetness.

It is the objective of this invention to prepare a product with the aforementioned desirable characteristics. The invention is not limited to the dipping of fresh fruit in an artificial sweetener prior to freezing but rather to techniques by which the artificial sweetener may be added to a rapidly rehydratable product in such a manner that upon rehydration of the food produce the artificial sweetener is retained by the product and the rehydrating liquid is not noticeably sweetened. It is a further object of the present invention to provide a method for sweetening foodstuffs which does not adversely affect the appearance of the foodstuff and which overcomes the difficulties associated with preparing a sugar sweetened product such as flaking off of the sugar which remains on the surface of the product during handling or increased freeze drying times due to excessive addition of moisture with sugar solutions.

DESCRIPTION OF THE PREFERRED EMBODIMENT

The product of this invention is a freeze dried foodstuff which has been artificially sweetened. The sweetener has been applied in such a manner as to penetrate the outer surface of the foodstuff to freeze drying. A critical feature of this product is that it is rapidly rehydratable e.g. within 30–60 seconds in milk. Rapid rehydration is necessary in order to permit the hydrating fluid to carry the sweetener further into the freeze dried product before it can be absorbed by the hydrating fluid. While the exact mechanism is not fully understood it is theorized that because the food product absorbs the hydrating fluid quickly, a mass flow situation is set up whereby the artificial sweetener is carried into the food product, similar to a board being carried along in a fast current. The mass flow being such an overriding force that the artificial sweetener does not have a chance to diffuse out into the hydrating medium while the food product is being rehydrated. It is probable that given sufficient time after rehydration the artificial sweetener would be absorbed into the remainder of the hydrating medium in contact with the food product. Therefore, the product of this invention is particularly useful as a food product which will normally be consumed in a period of sufficiently sort duration so that the artificial sweetener will not migrate to the unabsorbed fluid before the product is completely consumed. In this regard the freeze dried fruits of this invention are particularly adaptable for use with dried cereals as a ready-to-eat breakfast product. Normally after milk is added to a breakfast cereal, the product is consumed within about five minutes and in this period of time no noticeable sweetness is imparted to the milk.

Since rapid rehydration of the food product is considered to be one of the essential elements of the invention the product of this invention is necessarily limited to foods processed in such a manner that rapid rehydration will be a characteristic of the dry product. The necessary characteristic of rapid rehydration may be imparted to the food product by any known process which results in a product having the desired characteristic. One means of producing such a product is as follows: freshly picked foodstuffs are frozen before they have had time to deteriorate in quality. The freezing step is started by placing the foodstuff in trays in a freezing room. The air in the freezing room may be static or force-draft, as long as the temperature is maintained sufficiently low to cause the food to cool to a temperature of about 30° to 32° F. At this point the driving force between the cooling air and the fruit should be sufficiently small to allow the fruit to slowly freeze over a period of several hours. When the bulk of the moisture in the food has been frozen the temperature curve of the food will start to dip from a plateau and descend toward the temperature of the cooling air. At this point the air temperature can be lowered and the food again allowed to exhibit a plateau at some other freezing temperature such as 20° to 25° F. This process of freezing the fruit slowly should be continued until all of the water in the food product has been completely frozen. The freezing is carried on over a period of several hours so that the water in the food is allowed to crystallize and the crystals are allowed to grow into large crystals sufficient to cause the cellulose structure in the food product to be ruptured. After all of the water has been frozen the temperature of the foodstuff is then lowered sufficiently to insure that the product will be completely frozen and remain in a completely frozen state when it is transferred to a vacuum freeze drying chamber. In the vacuum freeze drying chamber the foodstuff is then dehydrated by sublimation to a moisture content of about 2 to 3%. The dried product may then be removed from the chamber and packaged in water vapor resistant packages or may be stored in a low humidity area for further processing. A foodstuff and particularly a fruit which is subjected to the foregoing freezing and freeze drying treatment will be found to have the desired property of rapid rehydration in milk.

The freezing technique may be modified in that after the initial freezing the fruit may be warmed to a temperature of about 10° to 25° F. so that it may be comminuted into pieces of a desirable size while still sufficiently frozen to retain its natural juices but not sufficiently brittle to shatter upon communition. The pieces of frozen fruit would then be chilled down to a temperature sufficiently low to insure that they remain frozen while being put into the freeze dryer and the drying process is completed as before. It will become apparent to one skilled-in-the-art that the freezing time may be varied depending upon the fruit which is being frozen and the size of the desired pieces. In any event, the freezing variables will be controlled such that the final freeze dried fruit, if it is to be used with a cereal for a breakfast food, will have a rehydration rate in milk of from 30 to 60 seconds.

A foodstuff prepared by the aforedescribed techniques, will have the desired property of rapid rehydration. It now remains to be shown how such a product may be prepared with a sufficient amount of an artificial sweetener to impart the desired sweetness to the food product, and how the artificial sweetener may be added in such a manner that it will not be absorbed by the hydrating medium when the freeze dried foodstuff is being rehydrated. It has been found that the techniques of dipping and spraying an artificial sweetener onto the fruit can be used. These techniques are satisfactory if used prior to freezing or after freezing but prior to freeze drying. When applying the artificial sweetener to the foodstuff, it is found that the artificial sweetener impregnates the surface of the foodstuff and that after freeze drying there is no visible film of sweetener remaining on the surface. The dry product has a desirable, natural appearance.

It has been found that addition of the artificial sweetener to the food after it has been freeze dried is not desirable. If the artificial sweetener has been added by dusting, the sweetener tends to cling to and coat the outer surface of the product resulting in an unnatural appearance. Also, the dusted on sweetener tends to flake off on additional handling. If the artificial sweetener is added by spraying after the freeze drying, it is found that an undesirable surface film remains which causes a white, spotty appearance. Therefore, it is considered essential that the artificial sweetener be added prior to freeze drying. Furthermore, when the sweetener is added after freezing but prior to freeze drying, it is desirable to warm the product to a temperature of about 10° to 25° F. (and most preferably 21°–24° F.) so that there is some softening of the ice on the outer surface of the product, thus permitting the sweetener to penetrate the surface. After adding the sweetener, the product is again reduced in temperature prior to transferring it to the freeze dryer.

The artificial sweetener may be any of the conventionally known artificial sweeteners for example, saccharin, N-cyclohexylsulfamic acid, the sodium and calcium salts of the foregoing and mixtures of such sweeteners. A preferred artificial sweetener for use according to the present invention is a mixture of 7 parts by weight of sodium cyclohexylsulfamate and one part by weight of sodium saccharin. The quantity of artificial sweetening agent used will be determined by taste, enough being present to give a taste equivalent to that of natural sweetening agents. In case of strawberries about 0.12% sweetener based on the weight of the fresh strawberries or about 1.2% based on the weight of the freeze dried strawberries is preferred. The procedure outlined in the foregoing paragraphs is particularly applicable to fruits in general and particularly to strawberries, peaches, bananas, blueberries, raspberries, blackberries, pineapples, apples and cranberries. However, the process is not limited to fruits but is equally applicable to other foodstuffs, for example, tomatoes, peas and other vegetables. In the case of strawberries, peaches and bananas the frozen fruit is preferably sliced to from about one-quarter inch to three-eighths inch sections after the frozen fruit has been re-warmed to a semi-frozen state (10° to 25° F.). In the case of blueberries the whole berries are frozen, warmed to a temperature of about 10° to 25° F., preferably about 22° F., and then pricked or pierced to develop holes in the skin and cellulose structure of the berry. This is done without destroying the whole berry appearance, texture and structure. The pricking operation enables the blueberries to be freeze dried in a much shorter time and prevents shriveling. The following examples are illustrative of the present invention without however, limiting the same thereto.

EXAMPLE 1

10 pounds of freshly picked whole strawberries whose stems had been removed were washed in water and graded for uniformity. Strawberries having a particle size of about ¾ to 1 inch in diameter were then arranged in monolayers on freezing trays and the freezing trays were placed in a large freezing room having an ambient temperature of 0° F. The strawberries took about one-half hour to cool from room temperature to about 28° F. and about six hours for substantially all of the water to be frozen at 28° F. The strawberries were then allowed to cool to 0° F. A cooling curve in which temperature was plotted against time showed a temperature profile wherein an initially relatively steep slope down to the freezing point of the moisture in the fruit was followed by a flat line or plateau during the actual change from a liquid moisture state to a frozen moisture state, the flat line again sloping rapidly when substantially all of the water was frozen and the product temperature lowered to 0° F. The strawberries remained in the plateau for six hours and in this time developed a growth of ice crystals sufficiently large to at least partially rupture the cellular walls of the strawberries. The frozen strawberries were then stored at 0° F. to protect the strawberries against enzymatic or bacterial degradation, arranged in monolayer fashion on solid aluminum trays and freeze dried in 10 lb. charges in a freeze dryer under a vacuum of 100 microns Hg, a platen temperature of 100° F. and a condenser temperature of −40° F. for about 20 hours until a terminal moisture content of 1.5% was attained. The resulting product has the appearance and taste of natural unsweetened strawberries.

EXAMPLE 2

Five hundred forty-seven grams of sodium cyclohexylsulfamate, 76 grams of saccharin and 150 pounds of water were mixed in a 50-gallon metal container until the sodium cyclohexylsulfamate and saccharin were completely dissolved. The temperature of the solution was maintained between 50° F. and 60° F. This solution was approximately equal in sweetening power to a 30% aqueous sugar solution. Ten pounds of washed, whole, fresh strawberries, whose stems had been removed, were placed into a wire mesh stainless steel basket which was then submerged in the sodium cyclohexylsulfamate-saccharin solution for 60 seconds during which time the strawberries were gently agitated to assure uniform contact with the solution. After this 60-second immersion, the berries were allowed to drain for 60 seconds and then were placed on freezer trays. The fruit was cooled, frozen and freeze dried to 2.0% moisture according to the procedure of the previous example. The resulting product had the appearance of fresh strawberries and a taste equivalent to that of strawberries sweetened by the addition of natural sweeteners and had an acceptable level of sweetness as determined by consumer tests, whereas this level of sweetness could not be obtained with any amount of sugar which could be used in the process. The degree of preference for the artificially sweetened strawberries was two to one over unsweetened strawberries.

The freeze dried artificially sweetened strawberries (moisture content 2.0%) were then combined with corn flakes (moisture content 2%) at a level of about 7–10% by weight strawberries ad 90–93% corn flakes. The blending operations was conducted in a packing room having a relative humidity of 30% in a period of less than 10–15 minutes thereby limiting moisture pickup of the strawberries to less than 1%. The strawberry-corn flake cereal was then packaged in a water resistant, wax-laminated foil liner which was placed inside a chip-board shell and enclosed with a wax-laminated coil over-wrap. The packaged product having a terminal moisture content of less than 2.5% for the strawberries and about 2% for the corn flakes was stored in this form at 70° F. and 50% relative humidity for 3–6 months without any degradation in product quality.

At the end of this period, the strawberries were found to reconstitute in milk or cream in about 60 seconds to a flavor, texture, and appearance equivalent to that of fresh strawberries sweetened by the addition of natural sweeteners. The breakfast cereal could then be eaten within 1–5 minutes with the berries being fully reconstituted, but not mushy and the cereal still in a crisp form.

The strawberries were found to have a lasting sweetness similar to that obtained by the use of natural sweeteners, instead of the fleeting bloom of sweetness ordinarily experienced with artificial sweeteners and had the desired blend of sweetness and tartness similar to sugar-sweetened strawberries. The milk or cream used as rehydrating liquid did not get noticeably sweet.

EXAMPLE 3

A solution was prepared by mixing 100 grams of sodium cyclohexylsulfamate and 14 grams of saccharin in 1,000 ml. of water. The materials were mixed until the sodium cyclohexylsulfamate and sodium saccharin were completely dissolved. Two pounds of washed, fresh, whole strawberries, whose stems had been removed, were placed on a screen container. Then 10 ml. of the solution of artificial sweeteners were sprayed on the surface of the fruit using a fine pressure spray at 50 p.s.i.g. The whole berries were gently agitated to change their position on the screen to assure uniform coating with the spray. After spraying, the strawberries were placed on trays cooled, frozen, and freeze dried according to the procedure of Example 1.

EXAMPLE 4

The procedure of Example 1 was followed with the exception that the frozen strawberries were kept in the freezing plateau for only 2 hours at a temperature of 15° F. The strawberries were then frozen to below 0° F., stored and then warmed or tempered to about 23° F. in preparation for the cutting operation. Tempering was desirable to render the berries less brittle. The berries were then cut into halves and placed on a screen container. Then 10 ml. of a solution prepared as described in Example 3 were sprayed on the surface of the frozen strawberries using a fine pressure spray at 50 p.s.i.g. The strawberries were agitated during spraying to assure uniform coverage. After spraying, the strawberries were refrozen to below 0° F. and then freeze dried in about 18 hours to a terminal moisture content of less than 1.5% according to the procedure of Example 1.

EXAMPLE 5

Strawberries which had been frozen according to the procedure of Example 4 in 15 minutes were warmed to about 23° F. and sliced into sections about ¼ inch to about ⅜ inch thick. A mixture of 7 parts by weight of sodium cyclohexylsulfamate and 1 part by weight of sodium saccharin was applied as in Example 3. The strawberries were then refrozen to below 0° F. and freeze dried to a terminal moisture of about 1.5%.

The strawberries prepared according to Example 3–5 above had an acceptable level of sweetness, the appearance of fresh strawberries and a taste equivalent to that of strawberries sweetened by the addition of natural sweeteners.

EXAMPLE 6

A quantity of artificially sweetened, freeze dried strawberries prepared according to the procedure of Examples 3–5 was mixed in a cereal bowl with a ready-to-eat breakfast cereal (corn flakes) in a quantity normally consumed as a breakfast food, and milk was added to the mixture. The mixture rehydrated in about 60 seconds to produce a flavor, texture and appearance of fresh strawberries, while the cereal remained crisp and did not become mushy. In all cases the strawberries had a satisfactory sweetness of taste comparable to that of strawberries sweetened by the addition of natural sweeteners, while the milk did not become noticeably sweet, indicating that the artificial sweeteners remained in the strawberries and did not wash off into the milk.

EXAMPLE 7

Two pounds of wedge-shaped peach sections which had been frozen according to the procedure of Example 1 were warmed to about 20° F. and sliced perpendicular to their length into ¼ inch slices. The ¼ inch slices were then sprayed with 20 ml. of a solution of artificial sweeteners prepared by dissolving 1504 grams of sodium cyclohexylsulfamate and 21 grams of sodium saccharin in 3,000 ml. of water. After spraying, they were placed on trays, refrozen completely and freeze dried according to the procedure of Example 1. When reconstituted with milk, the peaches had the appearance of fresh peaches and a taste comparable to that of peaches that had been sweetened by the use of natural sweeteners.

While this invention has been described by reference to specific examples, it is to be limited only by the scope of the appended claims.

What is claimed is:

1. In a process for producing improved freeze-dried fruit capable of rehydration in milk within 30–90 seconds wherein said fruit is cooled to the freezing point of the water in the fruit, freezing said water in from 5 minutes to 8 hours to develop a growth of ice crystals which expand the cellular structure of the fruit, cooling said fruit to below 0° F., tempering the fruit to a temperature of from 10° F. to 25° F., dividing the tempered fruit into particulate pieces, cooling the particulate pieces to below 0° F., and freeze-drying the particulate pieces to a terminal moisture content of less than 3%, the improvement which comprises impregnating the fruit with an artificial sweetener prior to freeze-drying the fruit.

2. The process of claim 1 wherein the artificial sweetener is impregnated into the fruit by dipping the fruit in a solution of the artificial sweetener and draining the excess solution from the fruit prior to freezing.

3. The process of claim 1 wherein the artificial sweetener is impregnated into the fruit after the fruit is tempered and the tempered fruit divided into particulate pieces and before the particulate pieces are cooled to below 0° F.

4. The process of claim 1 wherein the artificial sweetener is impregnated into the fruit by spraying the fruit with a solution of the artificial sweetener prior to freezing.

5. A process according to claim 1 wherein the artificial sweetener is selected from the group consisting of saccharin, N-cyclohexylsulfamic acid and the sodium and calcium salts of said sweeteners.

6. The process of claim 1 wherein the artificial sweetener comprises a mixture of about 7 parts by weight of the sodium salt of N-cyclohexylsulfamic acid and about 1 part by weight of saccharin.

7. The process of claim 1 wherein the freeze-dried fruit is combined with a dry breakfast cereal, said cereal being dried to a moisture content of from 2 to 3%, and packaging said fruit-cereal mixture at an in-package moisture level of below 3%.

8. The process of claim 1 wherein the fruit is strawberries, the water in said strawberries being frozen in about 2 hours, the strawberries being further cooled to below 0° F., the frozen strawberries being tempered to a product temperature of from 10° F. to 25° F., said tempered berries being sliced into halves having a thickness of 5/16 to ⅝ inch, said sliced strawberries being impregnated with an artificial sweetener and then being cooled to below 0° F. prior to freeze-drying.

9. The process of claim 1 wherein the fruit is strawberries, the water in said fruit being frozen in from 5 to 15 minutes, the strawberries being further cooled to below 0° F., the frozen strawberries being tempered to a product temperature from 10° F. to 25° F., slicing said tempered strawberries into particulate pieces having a thickness of from 3/16 to ¼ inch, impregnating said particulate pieces with an artificial sweetener and cooling said pieces to below 0° F. prior to freeze-drying.

10. The process according to claim 1 wherein the fruit is peaches; peeling said peaches, cutting said peaches into wedge-shaped sections, pitting said peaches, freezing the water in said peaches in from 5 to 8 hours, cooling the peaches to below 0° F., tempering said peaches to a product temperature of about 20° F., further slicing said peaches into particulate pieces, spraying said peach slices with a solution of artificial sweetener and cooling said peaches to below 0° F. prior to freeze-drying.

References Cited

UNITED STATES PATENTS

| 2,278,472 | 4/1942 | Musher | 99—199 |
| 2,693,419 | 11/1954 | Gager | 99—83 |
| 2,876,105 | 3/1959 | Jucaitis et al. | 99—141 |

OTHER REFERENCES

Olsen, Cyclamates in Citrus Products, Florida State Horticultural Society, 1960.

Nair, A Guide to Freeze-Drying at Home and Abroad, Food Canada, March 1962, pp. 13 to 15.

A. LOUIS MONACELL, Primary Examiner

S. B. DAVIS, Assistant Examiner

U.S. Cl. X.R.

99—103, 141, 204